United States Patent Office 3,253,042
Patented May 24, 1966

3,253,042
α,α'-POLYTHIOBIS(2,6-DIALKYLPHENOLS)
Calvin J. Worrel, Detroit, Mich., assignor to Ethyl Corporation, New York, N.Y., a corporation of Virginia
No Drawing. Continuation of application Ser. No. 53,384, Sept. 1, 1960. This application July 11, 1962, Ser. No. 209,265
6 Claims. (Cl. 260—608)

This application is a continuation of application S.N. 53,384, filed September 1, 1960, now abandoned.

This invention relates to novel and useful sulfur-containing substituted phenolic compounds. This invention also relates to a novel and useful process for the preparation of these compounds. More particularly this invention relates to sulfur-bridged 2,6-dialkyl-p-cresols and a process for preparing them. The compounds of this invention are extremely useful antioxidants in lubricating oil, rubber and rubber like materials and a wide range of other organic media.

In recent years phenolic compounds have achieved preeminence as antioxidants. Attempts have been made to impart other properties to these compounds such as extreme pressure properties. In this regard sulfur has been added to the molecule, in all cases to the benzene ring. Results have not always been satisfactory and, indeed, the properties of the resultant additives have been very closely dependent upon reaction conditions and reagent concentrations. Another drawback is the difficulty found in putting more than one sulfur atom in the molecule. A need, therefore, exists for compounds which contain sulfur and are at the same time phenolic but which can be prepared readily and without need for expensive process control.

Accordingly, an object of this invention is to provide novel sulfur-containing phenolic compounds. A further object is to provide such compounds wherein more than one molecule of sulfur is bonded through an alkyl group to the benzene ring. Another object is to provide a novel chemical process for preparing these sulfur containing compounds. A still further object is to provide a process which comprises reacting a 3,5-dialkyl-4-hydroxybenzyl chloride with an alkali metal sulfide. Other objects of this invention will be apparent from the following description.

The above and other objects of this invention are accomplished by providing a process which comprises reacting a compound having the formula:

I. 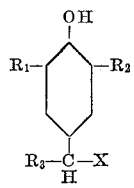

wherein $R_1$ is an alkyl radical having from 1 to 12 carbon atoms, $R_2$ is an alpha-branched alkyl radical having from 3 to 12 carbon atoms, $R_3$ is selected from the group consisting of hydrogen alkyl radicals having from 1 to 12 carbon atoms and mononuclear aryl radicals having from 6 to 12 carbon atoms, and X is a halogen, with an alkali metal sulfide having the formula $M_2S_y$ wherein M is an alkali metal and $y$ is an integer from 2 to 4. The halogen preferred is chlorine but other halogens of an atomic weight greater than 17 may be used. Chlorine is preferred because of definite cost advantages and its high reactivity. Sodium is preferred as the alkali metal because of its ready availability and high reactivity but potassium, lithium, rubidium or cesium may also be used.

The preparation of certain preferred reactants of Formula I is disclosed in copending application, Serial No. 53,363, filed September 1, 1960, entitled "Organic Aromatic Compounds," the inventor being Joseph D. Odenweller. They can be prepared by reacting a suitable 2,6-dialkylphenol with an aldehyde having from 1 to 13 carbon atoms and concentrated hydrogen halide. Thus, 2,6-di-tert-butyl-4-hydroxybenzyl chloride can be prepared by reacting 2,6-di-tert-butylphenol with formaldehyde and 35 percent hydrochloric acid.

The benzyl chloride and alkali metal sulfide are preferably present in substantially equimolar quantities. The alkali metal sulfide may also be present in molar excess, up to 10 times the molar concentration of the benzyl chloride. The reaction will proceed when the benzyl chloride is in molar excess, but upon distillation of the product, decomposition of the benzyl chloride makes it undesirable to have it in substantial excess. There is no special order in which the reactants need be mixed. The reaction will proceed equally well when the benzyl chloride is added to the alkali metal sulfide or when the sulfide is added to the chloride.

The solvents used in the practice of this invention may be secondary and tertiary alcohols, ketones, ethers or any suitable polar solvent. For example, the solvents used may be aliphatic secondary and tertiary alcohols having from 3 to 5 carbon atoms such as isopropanol, sec-butyl alcohol and tertiary amyl alcohol, ketones having from 3 to about 13 carbon atoms such as acetone, methylethyl ketone, methyl-n-propyl ketone and benzophenone; glycols having up to 6 carbon atoms such as ethylene glycol and hexamethylene glycol, the monoethers of the lower glycols such as ethylene glycol monomethyl ether up to ethylene glycol monoamyl ether, or the cyclic diethers of glycol such as dioxane.

The use of the above solvents facilitates the reaction but it will also proceed when conducted by adding the sulfide directly to the benzyl chloride.

The temperatures employed in practicing this invention vary from about 20° C. to the reflux temperature of the highest boiling solvent, about 305° C., at reaction times of from one-half hour to one week or more to give a good yield of product.

A preferred temperature range is from 80° to about 200° C. since the reaction proceeds at a sufficiently rapid rate in this temperature range to give a good yield of product in a reasonable amount of time with a minimum of undesired side reactions.

Although excellent results are obtained throughout the temperature and time ranges stated above, preferred reaction times are from about two hours to about 12 hours. These reaction times give excellent results.

To obtain the elevated temperatures sometimes employed in these reactions, elevated pressure may be used. However, with most of these compounds, atmospheric pressure is sufficient.

Stirring the reaction mixture facilitates the reaction but is not essential to the process, especially when refluxing the reaction mixture.

In another embodiment of this invention there is provided compounds produced by the process of this invention which have the formula:

II.

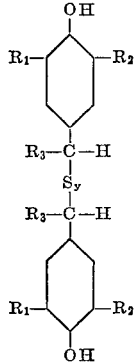

wherein $R_1$, $R_2$ and $R_3$ are as in Formula I and $y$ is a small integer from 2 to 4. They are water insoluble, white to yellow crystalline solids. They are ashless, hydrolytically stable and non-volatile, facilitating their incorporation into a wide range of organic materials.

The following examples illustrate the practice of this invention according to the method outlined above.

Example 1

A mixture of 19.2 parts of $Na_2S_2$ dissolved in 15 parts of water, 120 parts of isopropyl alcohol and 50 parts of 3,5-di-tert-butyl-4-hydroxybenzyl chloride (obtained by reacting 2,6-di-tert-butylphenol with para-formaldehyde and hydrochloric acid) are refluxed for two hours in a reaction vessel equipped with a heating means, a thermometer, water-cooled condenser and means for stirring. After standing two days at room temperature, the solids are collected by filtration, washed with water and dried. They are then recrystallized from isooctane and methanol to give $\alpha,\alpha'$ - dithiobis(2,6 - di - tert - butyl - p - cresol), a crystalline solid.

Example 2

A solution of 76.3 parts of 3,5-di-tert-butyl-4-hydroxybenzyl chloride (obtained in the manner described in Example 1) in 360 parts of isopropanol was stirred at room temperature in the vessel described in Example 1, and 36 parts of $Na_2S_3 \cdot 9H_2O$ in 40 parts of water was added. Upon addition of the aqueous sodium sulfide there is a mild heat evolution and some $Na_2S_3$ precipitates from the two-phase mixture. More water (60 parts) is added to disolve the solids and the two-phase mixture is refluxed for two days. Chilling of the mixture produces solids which are filtered off, slurried with water and air dried. This material is taken up in isooctane and recrystallized, producing $\alpha,\alpha'$-trithiobis(2,6-di-tert-butyl-p-cresol).

Example 3

Three hundred and eighty parts of 2-methyl-6-(2'-dodecyl) - 4 - ($\alpha$ - bromo - n - octyl)phenol (prepared by reacting 2 - methyl - 6 - (2' - dodecyl)phenol with 2-ethylhexanol and hydrobromic acid), is dissolved in 750 parts diacetyl in a reaction vessel equipped with a means for stirring. Fifty-five parts of $Li_2S_4$ in 75 parts of water are added and the mixture is stirred for one week at 20° C. The solvent is stripped and the material is taken up in hot methanol and slowly poured into stirred ice water. The resultant solids are dried and recrystallized from methanol to give $\alpha^4,\alpha^{4'}$ - tetrathiobis [2-methyl-6-(2'-dodecyl)-4-(2'-ethylhexyl)phenol].

Example 4

A solution of 62 parts of 2-(3'-decyl)-6-(2'-hexyl)-4-($\alpha$-chloro-n-tridecyl)phenol (prepared by reacting 2-(3'-decyl)-6-(2'-hexyl)phenol with n-tridecaldehyde and hydrogen chloride) in 180 parts of tertiary amyl alcohol is heated together with a solution of 7.8 parts of $K_2S_2$ in 10 parts of water to 80° C. in a reaction vessel equipped with a stirrer, thermometer and water cooled condenser, for a period of 12 hours. The mixture is then filtered and recrystallized from isooctane and methanol to give $\alpha^4,\alpha^{4'}$-dithiobis(2-n-decyl-6-(2'-hexyl)-4-n-tridecylphenol).

Example 5

Thirty-one parts of 2-methyl-6-tert-butyl-4-($\alpha$-iodo-n-butyl)-phenol (prepared by reacting 2-methyl-6-tert-butylphenol with n-butyraldehyde and hydriodic acid) in 180 parts of benzophenone (preheated to 60° C.) together with 71 parts of $Cs_2S_4$ in 10 parts of water is heated at 305° C. for one half hour in a vessel as described in Example 4 to yield, after filtering and recrystallization, $\alpha^4,\alpha^{4'}$-tetrathiobis(2-methyl-6-tert-butyl-4-n-butylphenol).

Example 6

Using the vessel described in Example 4, 26.9 parts of 2 - n - dodecyl - 6 - tert - butyl-4-($\alpha$-chloroethyl)phenol (prepared by reacting 2 - n - dodecyl-6-tert-butylphenol with acetaledhyde and hydrochloric acid) is dissolved in 120 parts of dioxane with heating. To this is added slowly a solution of 8.7 parts of $Rb_2S_3$ in 15 parts of water. The mixture is heated to a temperature of 200° C. and is maintained at that temperature with stirring for two hours. It is then cooled, filtered and recrystallized from isooctane and methanol to give $\alpha^4,\alpha^{4'}$ - trithiobis(2-n-dodecyl-6-tert-butyl-4-ethyl-phenol).

Example 7

A mixture of 9.8 parts of $Na_2S_2$, 15 parts of water and 119.5 parts of 2,6-diisopropyl-4-($\alpha$-chloro-p-n-hexylbenzyl)phenol (prepared by reacting 2,6-diisopropylphenol with p-n-hexylbenzaldehyde and hydrochloric acid) in 250 parts of ethylene glycol n-butyl ether, is heated in the vessel described in Example 1, to 80° C. and maintained at that temperature for 12 hours. After cooling, the precipitate is filtered, washed with water, dried and recrystallized from isooctane and methanol to give $\alpha^4,\alpha^{4'}$-dithiobis(2,6-diisopropyl-4-p-n-hexylbenzylphenol) as a crystalline solid.

Examples of the compounds produced by this invention include: $\alpha,\alpha'$ - dithiobis(2 - n - butyl-6-tert-butyl-p-cresol) (prepared by the reaction of 3-n-butyl-5-tert-butyl-4-hydroxybenzyl chloride and $Na_2S_2$); $\alpha^4,\alpha^{4'}$-trithiobis(2-methyl-6-isopropyl-4-n-butylphenol) (prepared from the reaction of $K_2S_3$ with $\alpha$-n-propyl-3-methyl-5-isopropyl-4-hydroxybenzyl chloride); $\alpha,\alpha'$ - tetrathiobis(2 - ethyl-6-isoamyl-p-cresol) (prepared from the reaction of 3-ethyl-5-n-amyl-4-hydroxybenzyl chloride and $Li_2S_4$); $\alpha^4,\alpha^{4'}$-trithiobis[2-n-propyl-6-(3' - heptyl)-4-n-heptylphenol] (prepared from the reaction of $Cs_2S_3$ and $\alpha$-n-hexyl-3-n-propyl-5-(3'-heptyl)-4-hydroxybenzyl chloride); $\alpha,\alpha'$-dithiobis(2,6-diisopropyl-p-cresol) (prepared from the reaction of 3,5-diisopropyl-4-hydroxybenzyl chloride and $Rb_2S_2$); $\alpha^4,\alpha^{4'}$ - trithiobis[2-n-butyl-6-(2'-nonyl-4-n-dodecylphenol] (prepared from the reaction of $Na_2S_3$ with a $\alpha$-n-undecyl - 3 - n - butyl-5-(2'-nonyl)-4-hydroxybenzyl chloride); $\alpha,\alpha'$-tetrathiobis(2,6-di-tert-butyl - 4 - hydroxybenzyl chloride and $Na_2S_4$); $\alpha^4,\alpha^{4'}$-trithiobis[2-n-amyl-6-(4'-dodecyl)-4-n-butylphenol] (prepared from the reaction of $Na_2S_3$ and $\alpha$-n-propyl-3-n-amyl-5-(4'-dodecyl)-4-hydroxybenzyl chloride); $\alpha,\alpha'$-dithiobis(2-n-heptyl-6-tert-butyl-p-cresol) (prepared from the reaction of 3-n-heptyl-5-tert-butyl-4-hydroxybenzyl chloride and $Na_2S_2$); $\alpha^4,\alpha^{4'}$-trithiobis(2-n-nonyl-6-isopropyl-4-ethylphenol) (prepared from the reaction of $\alpha$-methyl-3-n-nonyl-5-isopropyl-4-hydroxybenzyl chloride and $Na_2S_3$); $\alpha,\alpha'$-tetrathiobis(2-n-dodecyl-6-sec-butyl-p-cresol) (prepared from the reaction of 3-n-dodecyl-5-sec-butyl-4-hydroxybenzyl chloride and $Na_2S_4$); $\alpha^4,\alpha^{4'}$-trithiobis(2,6-di-tert-butyl-4-benzylphenol) (prepared from the reaction of $Na_2S_3$ with $\alpha$-phenyl-3,5-di-tert-butyl-4-hydroxybenzyl chloride); $\alpha,\alpha'$-dithiobis[2-methyl-6-tert-butyl-4-(4'-hexylphenyl)phenol] (prepared from the reaction of $Na_2S_2$ and $\alpha$-(4'-hexylphenyl)-3-methyl-5-tert-butyl-4-hydroxybenzyl chloride).

In a preferred embodiment of this invention the compounds to be produced are compounds of Formula II wherein $R_3$ is hydrogen. These compounds are preferred because of their ease of preparation from readily available starting materials and greater antioxidant activity. Among the compounds prepared by this preferred embodiment are: $\alpha,\alpha'$-dithiobis[2-isopropyl-6-(3'-nonyl)-p-cresol] (prepared from the reaction of $Na_2S_2$ and 3-isopropyl-5-(3'-nonyl-4-hydroxybenzyl chloride); $\alpha,\alpha'$-trithiobis(2,6-di-tert-butyl-p-cresol) (prepared from the reaction of 3,5-di-tert-butyl-4-hydroxybenzyl chloride and $Na_2S_3$); $\alpha,\alpha'$-tetrathiobis[2 - n - propyl-6-(2'-octyl)-p-cresol] (prepared from the reaction of $Na_2S_4$ and 3-n-propyl-5-(2'-octyl)-4-hydroxybenzyl chloride); $\alpha,\alpha'$-dithiobis[2-sec-butyl-6-(3'-dodecyl)-p-cresol] (prepared from the reaction of $Na_2S_2$ with 3-sec-butyl-5-(3'-dodecyl)-4-hydroxybenzyl chloride); $\alpha,\alpha'$ - trithiobis(2 - methyl-6-isopropyl-p-cresol) (prepared from the reaction of 3-methyl-5-iospropyl-4-hydroxybenzyl chloride and $Na_2S_3$); $\alpha,\alpha'$-dithiobis(2,6-di-tert-butyl-p-cresol) (prepared from the reaction of $Na_2S_2$ and 3,5-di-tert-butyl-4-hydroxybenzyl chloride); $\alpha,\alpha'$-tetrathiobis[2-ethyl-6-n-(2'-dodecyl)-p-cresol) (prepared from the reaction of 3-ethyl-5-(2'-dodecyl)-4-hydroxybenzyl chloride and $Na_2S_4$); $\alpha,\alpha'$-trithiobis(2-methyl-6-isopropyl-p-cresol) (prepared from the reaction of $Na_2S_3$ and 3-methyl-5-isopropyl-4-hydroxybenzyl chloride); $\alpha,\alpha'$ - dithiobis(2-methyl-6-tert-butyl-p-cresol) (prepared from the reaction of $Na_2S_2$ and 3-methyl-6-tert-butyl-4-hydroxybenzyl chloride).

The most particularly preferred compound produced by the practice of this invention is $\alpha,\alpha'$-dithiobis(2,6-di-tert-butyl-p-cresol) (prepared from the reaction of $Na_2S_2$ and 3,5-di-tert-butyl-4-hydroxybenzyl chloride), which is a most superior antioxidant in lubricating oils and other organic media and is most readily and economically prepared.

The compounds produced by the practice of this invention are outstanding antioxidants. Therefore, a specific utility of this invention is a new composition of matter which comprises organic material normally tending to undergo oxidative deterioration in the presence of air, oxygen or ozone containing an appropriate quantity—from 0.001 up to about 5 percent, and preferably from about 0.25 to about 2 percent—of a compound of this invention as described in Formula II above.

The compounds produced by this invention find important utility as antioxidants in a wide variety of oxygen-sensitive material. Thus, liquid hydrocarbon fuels such as gasoline, kerosene and fuel oil are found to possess increased storage stability by the use of an antioxidant produced by this invention. Likewise, liquid hydrocarbon fuels such as gasoline which contain organometallic additives such as tetraethyllead as well as other organometallic compounds which are used as fuel additives attain appreciably increased oxidative stability by the use of compounds produced by the practice of this invention. In addition, lubricant oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils, soaps and greases; pastics; synthetic polymers such as polyethylene and polypropylene; organometalic compositions where such fluids contain tetraethyllead and tetraethyllead antiknock mixtures as well as other organometallics; elastomers, including natural rubber; lubricating greases; crankcase lubricating oils; and the like, greatly increase resistance to deterioration in the presence of air, oxygen or ozone.

The compounds produced by the practice of this invention are also very useful in protecting petroleum wax—paraffin wax and microcrystalline wax—against oxidative deterioration. They also find use in the stabilization of edible fats and oils of animal and vegetable origin which tend to become rancid, especially during long periods of storage because of oxidative deterioration. Typical representatives of these edible fats and oils are linseed oil, cod liver oil, caster oil, soybean oil, rapeseed oil, coconut oil, olive oil, palm oil, corn oil, sesame oil, peanut oil, babassu oil, butter fat, lard, beef tallow, and the like.

The compounds produced by this invention are also useful in preventing oxidative deterioration in lubricating oil compositions. Thus, a specific utility of these compounds is a lubricating oil normally susceptible to oxidative deterioration in small antioxidant quantity up to 5 percent of a compound as defined above.

To prepare such superior lubricants of this invention an appropriate quantity—from about 0.001 to about 5 percent and preferably from about 0.25 to about 2 percent—of a compound produced by this invention is blended with the base oil to be protected. Suitable base oils include mineral oils and also synthetic diester oils such as sebacates, adipates, etc., which find particular use as aircraft instrument oils, hydraulic and damping fluids and precision bearing lubricants. All of these base oils are normally susceptible to oxidative deterioration, especially at elevated temperatures. The finished lubricants of this invention have much greater oxidation stability and many other improved perforance characteristics as compared with the corresponding base oils.

To illustrate the benefits obtained by the practice of this invention a standard oil oxidation test is used. The equipment and test procedure by Kroger et al., Erdol and Kohle, 2, page 398 (1949), served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end monometer whereby the total uptake of oxygen by the oil is determined by noting the drop in height of the mercury in the monometer. The test oil sample is placed in the reaction cell which is then flushed with oxygen and the temperature is then raised and held at that selected for the test until the substrate oil undergoes catastrophic oxidation which is shown by a rapid oxygen uptake. In all cases the test oil is deliberately contaminated with iron hexoate as an oxidation promoter. In tests of this nature, the oxidation stability of a test lubricant is determined by measuring its induction period, that is, the time required for catastrophic deterioration under the above outlined conditions. The longer the induction period, the more stable the lubricant. In tests of this nature, at 150° C., a base oil containing no additive has a very low induction time while the same oil containing one percent by weight of $\alpha,\alpha'$-dithiobis(2,6-di-tert-butyl-p-cresol) has an induction time forty times that of the base oil alone.

To further show the useful properties of the novel compounds of this invention, recourse is had to the Polyveriform Oxidation Stability Test as described in the paper entitled "Factors Causing Lubricating Oil Deterioration in Engines," [Ind. and Eng. Chem., Anal, ed. 17, 302 (1945)]. See also "A Bearing Corrosion Test for Lubricating Oil and Its Correlation with Engine Performance," [Al. Chem., 21, 737 (1949)]. This test effectively evaluates the performance of lubricating oil antioxidants. The test equipment procedure employed and correlations of the results with engine performance are discussed in the first paper cited above. By employing various compounds produced by this invention in oxygen-sensitive lubricating oil, effective inhibition of oxidative deterioration is achieved.

Comparative tests are conducted using the method and apparatus essentially as described in the publication described above entitled, "Factors Causing Lubricating Oil Deterioration in Engines." One minor modification was that the steel sleeve and copper test piece described in this publication are omitted from the apparatus. In these tests an initially additive-free 95 V.I. solvent-refined SAE–10 crankcase oil is used. The principal test conditions consisted of passing 70 liters of air per hour through the test oil for a total period of 20 hours while maintaining the oil at a temperature of 300° F. Oxidative deterioration of the oil is further promoted by employing as oxidation catalysts 0.05 percent by weight of ferric oxide (as ferric 2-ethyl hexoate) and 0.10 percent by weight of lead bromide, both of these amounts being based upon the weight of oil employed.

Lubricating oils are prepared by blending one percent by weight of $\alpha,\alpha'$ - trithiobis(2,6-di-tert-butyl-p-cresol) with the oil described above. These compositions are compared in the Polyveriform Test with a sample of the oil not containing the antioxidant. Whereas during the test the oil containing no antioxidant increases in acid number to a high acid number and shows a tremendous increase in viscosity, the samples containing the antioxidants of this invention show only a slight acid number and an unappreciable increase in viscosity, thus showing an unusual improvement over the base oil.

Although this invention has been illustrated by compounds in which the two phenolic radicals are identical, compounds in which the two phenolic radicals are different can also be prepared and are embraced within the invention. Thus, a mixture of benzyl halides can be reacted with an alkali metal sulfide to form a mixture of thio ethers. Depending on the reactants and reaction conditions there is a distribution of diphenolic polythio ether products. Thus in an embodiment of this invention 100 parts of 2,6-di-tert-butyl-4-hydroxybenzyl chloride, 87 parts of 2,6-diisopropyl-4-hydroxybenzyl chloride and 39 parts of $Na_2S_2$ can be reacted to produce a mixture of about 25 percent, $\alpha,\alpha'$-dithiobis(2,6-diisopropyl-p-cresol), about 25 percent $\alpha,\alpha'$-dithiobis(2,6-di-tert-butyl-p-cresol) and about 50 percent (3,5-diisopropyl-4-hydroxybenzyl) - (3,5-di-tert-butyl-4-hydroxybenzyl)dithio ether. The mixture itself finds utility as an antioxidant. Indeed, in many applications the mixture is preferred over the individual components because of solubility, belting point and boiling point considerations. The mixture can also be distilled to separate the component compounds, each component showing antioxidant activity.

A further example of the reaction of mixed benzyl halides with an alkali metal sulfide is the reaction of 3-methyl-5-tert-butyl-4-hydroxybenzyl bromide with 3-(2'-dodecyl)-5-(3'-dodecyl)-4-hydroxybenzyl bromide and $Li_2S_3$ to produce a mixture of $\alpha,\alpha'$-trithiobis(2-methyl-6-tert-butyl-p-cresol), $\alpha,\alpha'$-trithiobis[2-(2'-dodecyl)-6-(3'-dodecyl)-p-cresol] and [3-methyl-5-tert-butyl-4-hydroxybenzyl] - [3 - (2' - dodecyl) - 5-(3'-dodecyl)-4-hydroxybenzyl]-trithio ether. Likewise, 2,6-di-sec-butyl-4-($\alpha$-iodo-n-octyl)phenol can be reacted with 2-(3'-octyl)-6-(2'-heptyl)-4-($\alpha$-chloro-p-n-hexylbenzyl)phenol and $K_2S_4$ to form a mixture of 3,5-di-sec-butyl-$\alpha$-n-heptyl-4-hydroxybenzyl] - [3 - (3'-octyl)-5-(2'-heptyl)-$\alpha$-p-n-hexylphenyl - 4-hydroxybenzyl]tetrathioether, $\alpha^4,\alpha^{4'}$-tetrathiobis[2 - (3' - octyl)-6-(2'-heptyl)-4-n-hexylbenzylphenol] and $\alpha^4,\alpha^{4'}$-tetrathiobis(2,6-di-sec-butyl-4-n-octylphenol). Also, 3-ethyl-5-isopropyl-4-hydroxybenzyl chloride can be reacted with 2-n-propyl-6-sec-butyl-4-($\alpha$-bromo-n-amyl)phenol and $Cs_2S_3$ to yield $\alpha,\alpha'$-trithiobis(2-ethyl-6-isopropyl-p-cresol), $\alpha^4,\alpha^{4'}$ - trithiobis(2-n-propyl-6-sec-butyl-4-n-amylphenol) and (3-ethyl-5-isopropyl-4-hydroxybenzyl) - (3 - n - propyl-5-sec-butyl-$\alpha$-n-butyl-4-hydroxybenzyl)trithioether. Further, 2 - n - butyl - 6-(3'-nonyl)-4-($\alpha$-chloro-n-tridecyl)phenol can be reacted with 2 - n - decyl - 6 - (4'-decyl)-4-($\alpha$-chloroethyl)phenol and $Rb_2S_2$ to give a mixture of [3-n-butyl-5-(3'-nonyl)-$\alpha$-n-dodecyl - 4 - hydroxybenzyl] - [3-n-decyl-5-(4'-decyl)-$\alpha$-methyl-4-hydroxybenzyl]dithioether, $\alpha^4,\alpha^{4'}$-dithiobis[2-n-butyl-6-(3'-nonyl)-4-n-tridecylphenol] and $\alpha^4,\alpha^{4'}$-dithiobis[2-n-decyl-6-(4'-decyl)-4-ethylphenol].

I claim:
1. A process for preparing a compound having the formula:

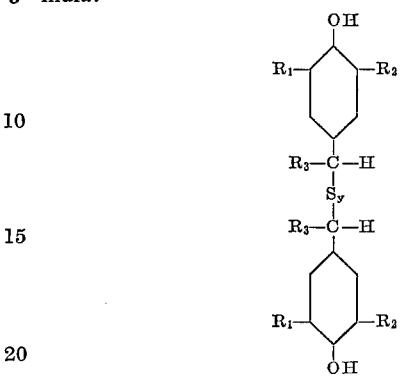

wherein $R_1$ is an alkyl radical having from one to 12 carbon atoms, $R_2$ is an alpha-branched alkyl radical having from 3 to 12 carbon atoms, $R_3$ is selected from the group consisting of hydrogen, alkyl radicals having from one to 12 carbon atoms and mononuclear aryl radicals having from 6 to 12 carbon atoms, and $y$ is an integer from 2 to 4 inclusive, which comprises reacting a compound having the formula:

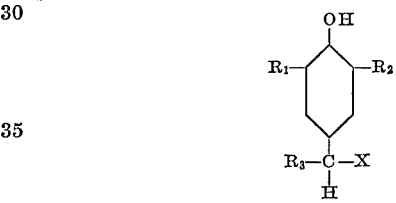

wherein $R_1$ is an alkyl radical having from one to 12 carbon atoms, $R_2$ is an alpha-branched alkyl radical having from 3 to 12 carbon atoms, $R_3$ is selected from the group consisting of hydrogen, alkyl radicals having from one to 12 carbon atoms, and mononuclear aryl radicals having from 6 to 12 carbon atoms, and X is a halogen selected from the class consisting of chlorine bromine and iodine, with an alkali metal sulfide having the formula: $M_2S_y$, wherein $y$ is an integer from 2 to 4 inclusive and M is an alkali metal.

2. The process of claim 1 wherein $R_3$ is hydrogen, X is chlorine, and M is sodium.
3. The process of claim 1 wherein $y$ is 2.
4. The process of claim 2 wherein $y$ is 2.
5. The process for preparing $\alpha,\alpha'$-dithiobis(2,6-di-tert-butyl-p-cresol), which comprises reacting 3,5-di-tert-butyl-4-hydroxybenzyl chloride with $Na_2S_2$.
6. A compound having the formula:

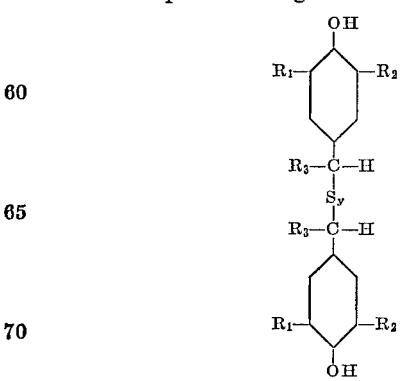

wherein $R_1$ is an alkyl radical having from 1 to 12 carbon atoms, $R_2$ is an alpha-branched alkyl radical having from 3 to 12 carbon atoms, $R_3$ is selected from the group consisting of hydrogen, alkyl radicals having from 1 to 12 carbon atoms and mononuclear aryl radicals having from 6 to 12 carbon atoms and $y$ is an integer of from 2 to 4.

References Cited by the Examiner
UNITED STATES PATENTS

| | | | |
|---|---|---|---|
| 2,273,471 | 2/1942 | Kimball | 260—608 |
| 2,488,134 | 11/1949 | Mikeska et al. | 260—609 |
| 2,790,833 | 4/1957 | Liao | 260—608 |
| 3,065,275 | 11/1962 | Goddard et al. | 260—609 |

CHARLES B. PARKER, *Primary Examiner.*

DANIEL D. HORWITZ, *Examiner.*